(12) United States Patent
Bestic et al.

(10) Patent No.: US 10,883,865 B2
(45) Date of Patent: Jan. 5, 2021

(54) FLOW RESTRICTING FLUID COMPONENT (71) Applicant: Swagelok Company, Solon, OH (US)

(72) Inventors: Michael D. Bestic, Sagamore Hills, OH (US); David J. Hasak, Concord, OH (US); Bryan S. Reiger, Willowick, OH (US); Andrew Creque, Macedonia, OH (US)

(73) Assignee: SWAGELOK COMPANY, Solon, OH (US)

( * ) Notice: Subject to any disclaimer, the term of this patent is extended or adjusted under 35 U.S.C. 154(b) by 0 days.

(21) Appl. No.: 16/574,147

(22) Filed: Sep. 18, 2019

(65) Prior Publication Data
US 2020/0088555 A1 Mar. 19, 2020

Related U.S. Application Data (60) Provisional application No. 62/775,072, filed on Dec. 4, 2018, provisional application No. 62/733,160, filed on Sep. 19, 2018.

(51) Int. Cl.
*G01F 1/34* (2006.01)
*F15D 1/00* (2006.01)
*F15D 1/06* (2006.01)
*F15D 1/14* (2006.01)
*B33Y 80/00* (2015.01)

(52) U.S. Cl.
CPC ............. *G01F 1/34* (2013.01); *F15D 1/0025* (2013.01); *F15D 1/06* (2013.01); *F15D 1/14* (2013.01); *B33Y 80/00* (2014.12)

(58) Field of Classification Search
CPC .................................... G01F 1/34; F15D 1/00
See application file for complete search history.

(56) References Cited

U.S. PATENT DOCUMENTS

| 4,153,083 | A | 5/1979 | Imler |
| 4,576,204 | A | 3/1986 | Smallhorn |
| 4,930,357 | A | 6/1990 | Thurston |
| 5,174,765 | A | 12/1992 | Williams |

(Continued)

FOREIGN PATENT DOCUMENTS

| CN | 203117796 | 8/2013 |
| EP | 1369672 | 7/2009 |

(Continued)

OTHER PUBLICATIONS

International Search Report and Written Opinion from PCT/US2019/051375 dated Jan. 27, 2020.

(Continued)

*Primary Examiner* — Jewel V Dowtin
(74) *Attorney, Agent, or Firm* — Calfee, Halter & Griswold LLP (57) ABSTRACT

A fluid component includes a cross-shaped body having laterally extending first and second flow ports and axially extending first and second access ports. The first flow port connected in fluid communication with the first access port by a first branch port. The second flow port connected in fluid communication with the second access port by a second branch port. The first and second access ports are connected in fluid communication by a convoluted flow restricting passage extending generally axially from the first access port to the second access port.

18 Claims, 13 Drawing Sheets

(56) References Cited

U.S. PATENT DOCUMENTS

| | | |
|---|---|---|
| 5,295,790 A | 3/1994 | Bossart |
| 5,303,731 A | 4/1994 | Vavra |
| 5,361,676 A | 11/1994 | Gibbs |
| 5,415,065 A | 5/1995 | McMills |
| 5,454,945 A | 10/1995 | Spearman |
| 5,469,749 A | 11/1995 | Shimada |
| 5,535,633 A | 7/1996 | Kofoed |
| 5,576,498 A | 11/1996 | Shambayati |
| 5,672,832 A | 9/1997 | Cucci |
| 5,750,892 A | 5/1998 | Huang |
| 5,893,354 A | 4/1999 | Detweiler |
| 6,436,720 B1 | 8/2002 | Oberbeck |
| 6,539,968 B1 | 4/2003 | White |
| 6,561,010 B2 | 5/2003 | Wilson |
| 6,609,431 B1 | 8/2003 | Tietsworth |
| 6,843,139 B2 | 1/2005 | Schumacher |
| 7,096,738 B2 | 8/2006 | Schumacher |
| 7,447,599 B2 | 11/2008 | Ellender et al. |
| 7,729,869 B2 | 6/2010 | Brown |
| 7,740,024 B2 | 6/2010 | Brodeur |
| 7,775,126 B2 | 8/2010 | Eckhardt |
| 7,784,361 B2 | 8/2010 | Wiedmann |
| 7,891,256 B2 | 2/2011 | Ushigusa |
| 7,942,069 B2 | 5/2011 | Peterson |
| 8,082,946 B2 | 12/2011 | Laverdiere |
| 8,281,669 B2 | 10/2012 | Ertl |
| 8,281,817 B2 | 10/2012 | Tinker |
| 8,297,478 B2 * | 10/2012 | Hughes ................ B23K 26/147 198/525 |
| 8,376,312 B2 | 2/2013 | Mudd |
| 8,418,549 B2 | 4/2013 | Speldrich |
| 8,656,772 B2 | 2/2014 | Qasimi |
| 8,718,954 B2 | 5/2014 | vonBlumenthal |
| 8,746,057 B2 | 6/2014 | Yasuda |
| 8,826,731 B2 | 9/2014 | Speldrich |
| 9,494,947 B2 | 11/2016 | Hirata |
| 9,562,796 B2 | 2/2017 | Lull |
| 9,683,429 B2 | 6/2017 | Mathiesen |
| 9,752,486 B2 | 9/2017 | Yang |
| 10,087,943 B2 * | 10/2018 | Taketomi ................ F04D 17/10 |
| 2001/0032674 A1 | 10/2001 | Brunet |
| 2002/0002425 A1 | 1/2002 | Dossey |
| 2003/0061888 A1 | 4/2003 | Gould |
| 2004/0083807 A1 | 5/2004 | Mudd |
| 2004/0177703 A1 | 9/2004 | Schumacher |
| 2006/0010989 A1 | 1/2006 | Clark |
| 2007/0017303 A1 | 1/2007 | Fujiwara |
| 2007/0151386 A1 | 7/2007 | McDonald |
| 2008/0250854 A1 | 10/2008 | Ding |
| 2009/0157040 A1 | 6/2009 | Jacobson |
| 2009/0221986 A1 | 9/2009 | Wang |
| 2013/0247995 A1 | 9/2013 | Erlich |
| 2014/0116217 A1 | 5/2014 | Hashish et al. |
| 2016/0076909 A1 | 3/2016 | Kicpera |
| 2017/0060143 A1 | 3/2017 | Ding et al. |
| 2017/0292864 A1 | 10/2017 | Zhang |
| 2018/0246533 A1 | 8/2018 | Somani |
| 2019/0321815 A1 | 10/2019 | Schmid |

FOREIGN PATENT DOCUMENTS

| | | |
|---|---|---|
| EP | 980507 | 7/2011 |
| EP | 2703787 | 9/2015 |
| EP | 2787329 | 2/2017 |
| GB | 2150039 | 1/1988 |
| JP | 3244849 | 1/2002 |
| JP | 2004157719 | 6/2004 |
| KR | 1855746 | 6/2018 |
| WO | 2017049782 | 3/2017 |

OTHER PUBLICATIONS

International Search Report and Written Opinion from PCT/US2019/051618 dated Jan. 27, 2020.

* cited by examiner

FLOW RESTRICTING FLUID COMPONENT

CROSS-REFERENCE TO RELATED APPLICATIONS

This application claims priority to and all benefit of U.S. Provisional Patent Application Ser. No. 62/733,160, filed on Sep. 19, 2018 and entitled FLUID COMPONENT WITH FLOW RESTRICTING PASSAGE, and U.S. Provisional Patent Application Ser. No. 62/775,072, filed on Dec. 4, 2018 and entitled LAMINAR FLOW ELEMENT, the entire disclosures of each of which are incorporated herein by reference.

BACKGROUND

Laminar flow elements (or LFEs) are generally used to measure the flow of gases, for example, for use with mass flowmeters or other such monitoring devices. A conventional laminar flow element operates by producing a differential pressure that is proportional to the velocity of the gas passing through a section of the laminar flow element, which is specifically configured to maintain the gas flow in a laminar state. Upstream and downstream pressure sensors detect this pressure differential, which is used to calculate the flow rate. Due to the typical length-to-diameter requirements of the restricting flow path of a laminar flow element (e.g., a 25:1 ratio), large size, intricate machining, or complex assembly requirements often result in increased manufacturing costs, extensive lead times, and/or undesirably large LFE components.

SUMMARY

According to an aspect of the present disclosure, a flow restricting fluid component includes a monolithic body including first and second axially extending ports connected in fluid communication by a convoluted flow restricting passage including one or more of: a helical shape, a spiral shape, a laterally extending undulating ribbon shape, and an axially extending undulating ribbon shape.

According to another aspect of the present disclosure, a fluid component includes a cross-shaped body having laterally extending first and second flow ports and axially extending first and second access ports. The first flow port connected in fluid communication with the first access port by a first branch port. The second flow port connected in fluid communication with the second access port by a second branch port. The first and second access ports connected in fluid communication by a convoluted flow restricting passage extending generally axially from the first access port to the second access port.

According to another aspect of the present disclosure, a flow sensing device includes a cross-shaped body having laterally extending inlet and outlet ports and axially extending upstream and downstream pressure ports, an upstream pressure sensor installed in the upstream pressure port, and a downstream pressure sensor installed in the downstream pressure port. The inlet port is connected in fluid communication with the upstream pressure port by an inlet branch port, and the outlet port connected in fluid communication with the downstream pressure port by an outlet branch port. The upstream and downstream pressure ports are connected in fluid communication by a laminar flow restricting passage extending generally axially from the upstream pressure port to the downstream pressure port.

According to another aspect of the present disclosure, a fluid component includes a body having laterally extending first and second flow ports and axially extending first and second access ports, with the first flow port connected in fluid communication with the first access port by a first branch port, the second flow port connected in fluid communication with the second access port by a second branch port, and a cavity disposed between the first and second access ports. An insert is installed in the cavity, the insert including a generally axially extending flow restricting passage extending from the first access port to the second access port

BRIEF DESCRIPTION OF THE DRAWINGS

Further advantages and benefits will become apparent to those skilled in the art after considering the following description and appended claims in conjunction with the accompanying drawings, in which:

DETAILED DESCRIPTION

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while specific exemplary embodiments in the present disclosure describe flow sensing devices with laminar flow restricting passages, in other embodiments, one or more of the features described herein may be applied to other fluid system components, including, for example, conduit fittings and valves, or for other purposes, such as, for example, to provide other types of flow paths (e.g., diverting, splitting), filtration, or heat trace or cold trace flow paths.

Figure 1A:
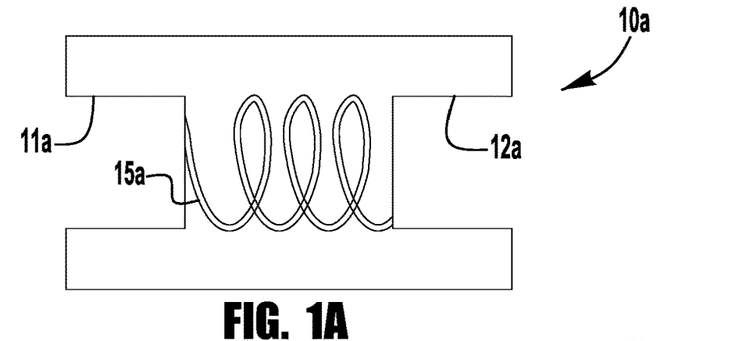
FIG. 1A is a schematic view of an exemplary fluid component having a helical convoluted flow passage, in accordance with an aspect of the present disclosure.
Figure 1B:
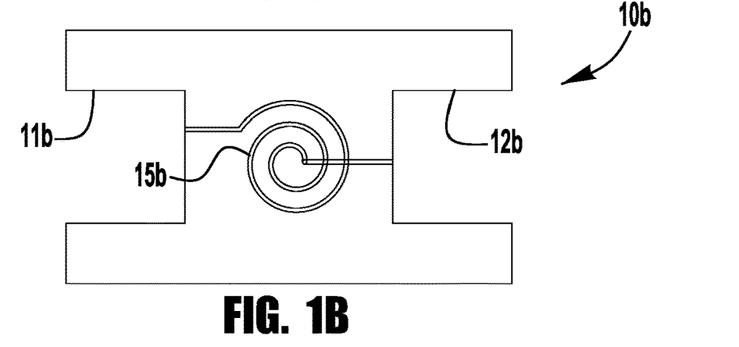
FIG. 1B is a schematic view of an exemplary fluid component having a spiral shaped flow passage, in accordance with another aspect of the present disclosure.
Figure 1C:
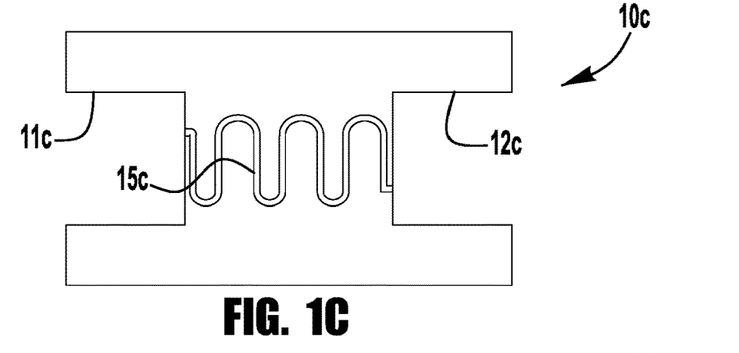
FIG. 1C is a schematic view of an exemplary fluid component having a laterally extending undulating ribbon shaped flow passage, in accordance with another aspect of the present disclosure.
Figure 1D:
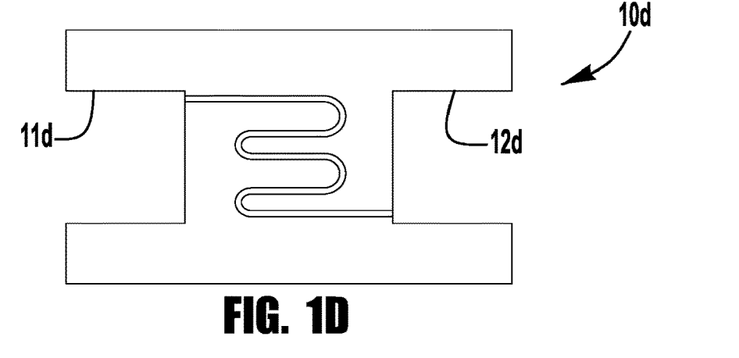
FIG. 1D is a schematic view of an exemplary fluid component having an axially extending undulating ribbon shaped flow passage, in accordance with another aspect of the present disclosure.

According to an aspect of the present disclosure, a fluid system component may be provided with a narrow flow passage having one or more convolutions, for example, to provide a passage having a greater length, and a greater length-to-diameter ratio, over an axial length of the fluid system component. The convoluted flow passage may be provided in any of a variety of suitable shapes. For example, as schematically shown in FIGS. 1A-1D, a fluid component 10a, 10b, 10c, 10d (e.g., laminar flow element, fitting body, or valve body) may include one or more convoluted flow passages 15a, 15b, 15c, 15d extending, for example, between a first (e.g., inlet) flow port 11a, 11b, 11c, 11d and a second (e.g., outlet) flow port 12a, 12b, 12c, 12d. In the exemplary embodiment of FIG. 1A, the flow passage 15a includes a generally helical shape. In the exemplary embodiment of FIG. 1B, the flow passage 15b includes a generally spiral shape. In the exemplary embodiment of FIG. 1C, the flow passage 15c includes a laterally extending undulating ribbon shape. In the exemplary embodiment of FIG. 1D, the flow passage 15d includes an axially extending undulating ribbon shape (FIG. 1D). In other embodiments, not shown, a flow passage may include some combination of two or more of the above described shapes (for example, an undulating spiral pattern or a helical spiral pattern). While the flow passage 15a, 15b, 15c, 15d may be specifically configured to maintain laminar flow through the fluid component 10a, 10b, 10c, 10d (e.g., as a laminar flow element, or LFE), in other embodiments, the flow passage may permit turbulent flow, or a combination of laminar flow and turbulent flow, while still providing for a consistent desired flow rate or range of flow rates.

Figure 2:
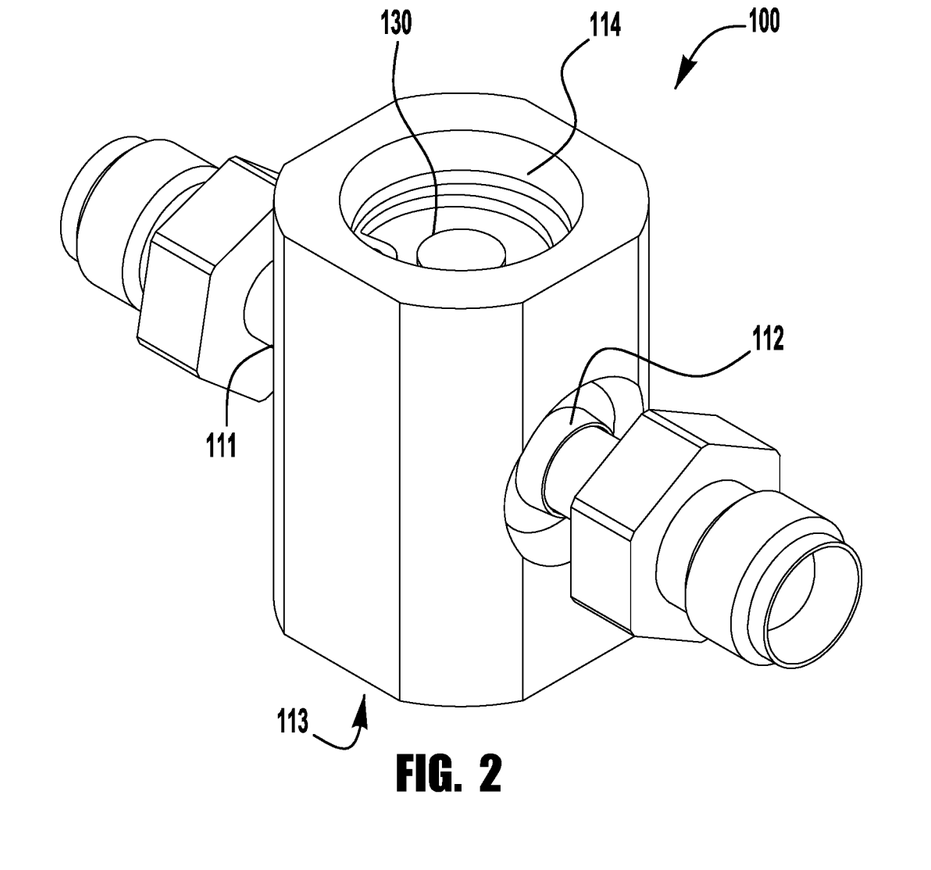
FIG. 2 is a perspective view of a flow sensing device, in accordance with an aspect of the present disclosure.
Figure 3:
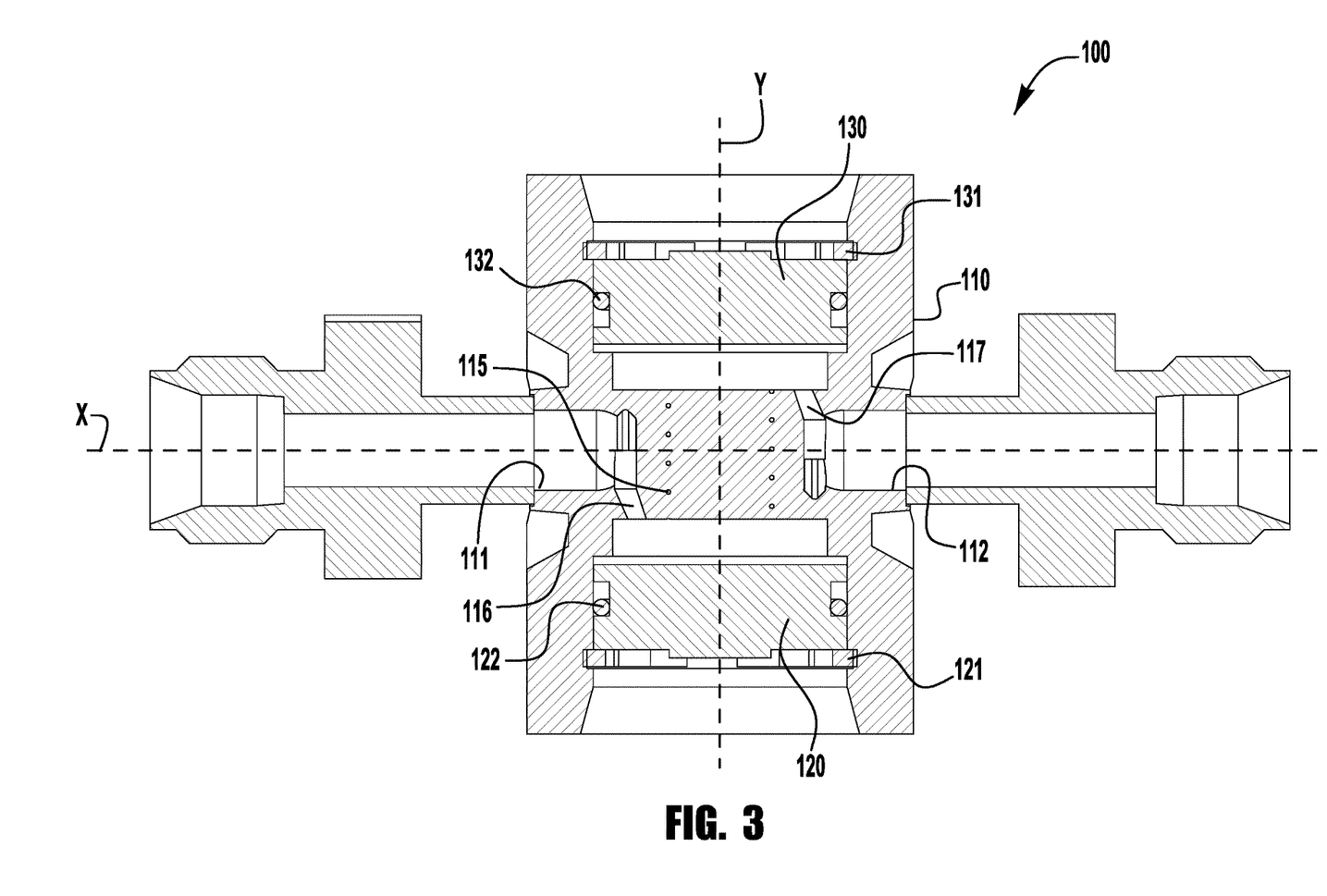
FIG. 3 is a side cross-sectional view of the flow sensing device of FIG. 2.

FIGS. 2 and 3 illustrate an exemplary flow sensing device 100 provided with a cross-shaped body 110 including laterally extending inlet and outlet ports 111, 112 and axially extending upstream and downstream pressure ports 113, 114. As shown, the inlet port 111 may, but need not, be substantially coaxial with the outlet port 112 (along axis X, as shown), and the upstream pressure port 113 may, but need not, be substantially coaxial with the downstream pressure port 114 (along axis Y, as shown). The inlet and outlet ports 111, 112 may include any suitable fluid system connectors, including, for example, one or more tube fittings, face seal fittings, threaded pipe ends, or weld ends, either integral with or attached (e.g., welded) to the body 110. The inlet port 111 is connected in fluid communication with the upstream pressure port 113 by an inlet branch port 116, and the outlet port 112 is connected in fluid communication with the downstream pressure port 114 by an outlet branch port 117. The upstream and downstream pressure ports 113, 114 are connected by a laminar flow restricting passage 115 extending generally axially from the upstream pressure port 113 to the downstream pressure port 114. As shown, other than the flow passage 115 and branch ports 116, 117, the body 110 may be substantially symmetrical about either or both of the X and Y axes.

In the exemplary illustrated embodiment, an upstream pressure sensor 120 is installed in the upstream pressure port 113 and is configured to generate a signal corresponding to an upstream pressure, and a downstream pressure sensor 130 is installed in the downstream pressure port and is configured to generate a signal corresponding to a downstream pressure. The pressure sensors 120, 130 may transmit signals to an electronic controller, for example, by wired or wireless communication, with the electronic controller being configured to evaluate the upstream and downstream pressures corresponding to the received signals, to determine a pressure differential across the flow restricting passage and a corresponding flow rate through the flow sensing device 100. The upstream and downstream pressure sensors 120, 130 may include any suitable type of pressure sensor (e.g., a piezoresistive strain gauge, a capacitive pressure sensor, an electromagnetic pressure sensor, a piezoelectric pressure sensor), which may be securely retained within the corresponding pressure port 113, 114, for example, using a retaining ring 121, 131, and may be sealed within the corresponding pressure port 113, 114, for example, using an O-ring or gasket seal 122, 132.

Figure 4:
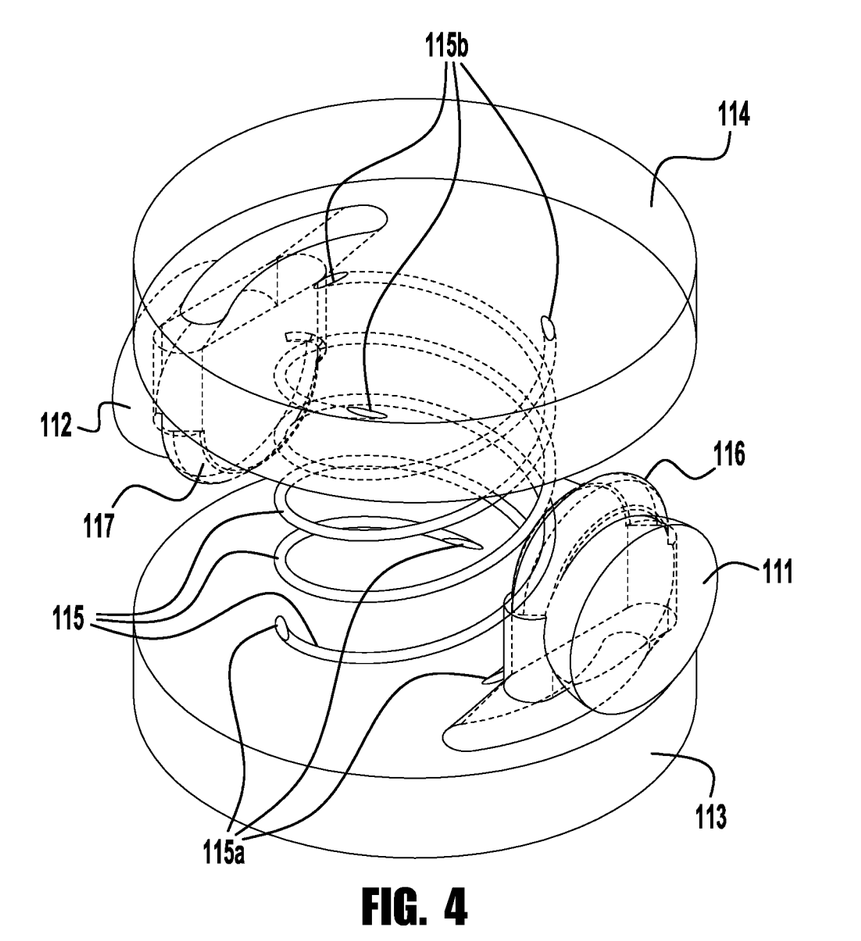
FIG. 4 is a perspective view of the flow passage and connecting ports of the flow sensing device of FIG. 2.

The compact arrangement of the cross-shaped body 110 of the flow sensing device 100 may allow the flow sensing device to be incorporated into smaller enclosures or smaller equipment, or more seamlessly into existing systems. According to an aspect of the present disclosure, the size of the body may be reduced or minimized by providing one or more convoluted flow passages as described above, allowing for a sufficiently large length to diameter ratio of the flow path without requiring a greater axial length of the body. As shown, the exemplary flow sensing device body 110 includes a generally helical laminar flow restricting passage 115 extending generally axially from the upstream pressure port 113 to the downstream pressure port 114, with a first end 115a of the helical passage intersecting the upstream pressure port 113 and a second end 115b of the helical passage intersecting the downstream pressure port 114. While the ends 115a, 115b of the passage 115 may extend continuously as shown, forming part of the helical shape, in other embodiments (not shown), the ends may form axially extending legs from the helical portion to the pressure ports. A perspective view of the flow path 115 and connecting ports 111, 112, 113, 114, 116, 117 is shown in FIG. 4, illustrating three helical flow passages 115. In other embodiments (not shown), other numbers (e.g., more or fewer than three) of helical flow paths may be utilized. Further, while the illustrated flow path has a circular cross-section, other cross-sectional shapes may be utilized, including, for example, oval, rectangular, diamond-shaped, trapezoidal, and teardrop-shaped cross-sections. The cross-sectional shape of the flow restricting passage may be selected for increased or reduced laminar flow, increased or reduced heat transfer, or a variety of other factors.

Figure 5:
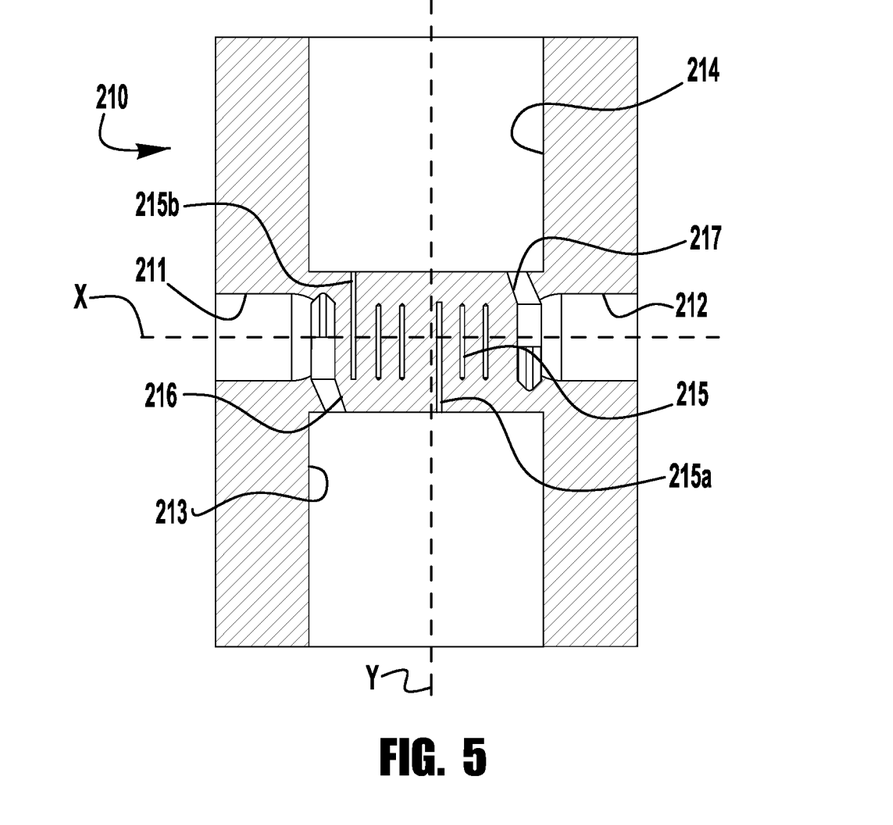
FIG. 5 is a side cross-sectional view of a flow sensing device body, in accordance with another aspect of the present disclosure.

FIG. 5 is a cross-sectional view of another exemplary body 210 (e.g., a flow sensing device body) including laterally extending first and second flow ports 211, 212 and axially extending first and second access ports 213, 214 (e.g., ports for installing pressure sensors). As shown, the first flow port 211 may, but need not, be substantially coaxial with the second flow port 212 (along axis X, as shown), and the first access port 213 may, but need not, be substantially coaxial with the second access port 214 (along axis Y, as shown). The first and second flow ports 211, 212 are shown as simple bores, but may include any suitable fluid system connectors, including, for example, one or more tube fittings, face seal fittings, threaded pipe ends, or weld ends, either integral with or attached (e.g., welded) to the body 210. The first flow port 211 is connected in fluid communication with the first access port 213 by a first branch port 216, and the second flow port 212 is connected in fluid communication with the second access port 214 by a second branch port 217. The first and second access ports 113, 114 are connected by a restricting passage 215 (e.g., a laminar flow restricting passage) extending generally axially from the first access port 113 to the second access port 114. As shown, other than the restricting passage 215 and the branch ports 216, 217, the body 210 may be substantially symmetrical about either or both of the X and Y axes.

Figure 6:
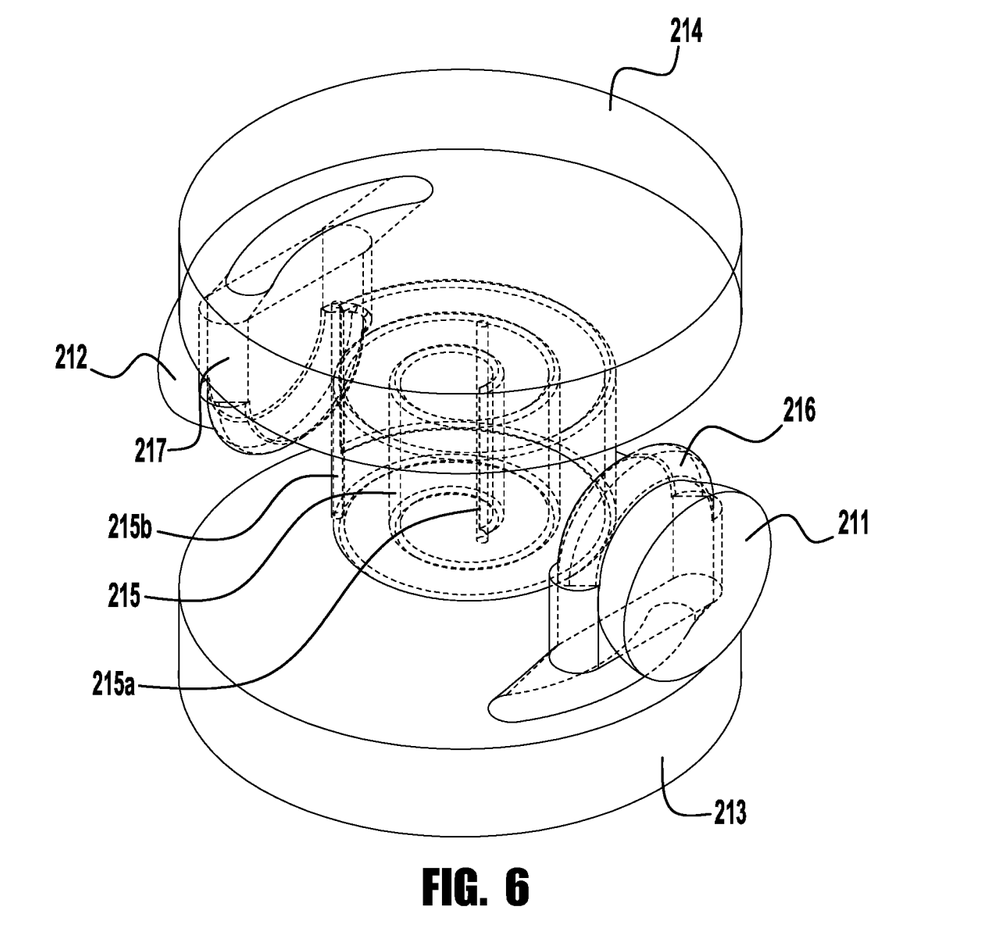
FIG. 6 is a perspective view of the flow passage and connecting ports of the flow sensing device of FIG. 5.

As shown, the exemplary flow sensing device body 210 includes a generally spiral shaped laminar flow restricting passage 215 extending generally axially from the first access port 213 to the second access port 214, with a first axially extending leg 215a extending from a central end portion of the spiral passage intersecting the first access port 213 and a second axially extending leg 215b extending from an outer end portion of the spiral passage intersecting the second access port 214. A perspective view of the flow path 215 and connecting ports 211, 212, 213, 214, 216, 217 is shown in FIG. 6. In other embodiments (not shown), multiple spiral flow paths may be utilized. Further, while the illustrated flow path has axially elongated, rectangular cross-section, other cross-sectional shapes may be utilized, including, for example, oval, circular, diamond-shaped, trapezoidal, and teardrop-shaped cross-sections. The cross-sectional shape of the flow restricting passage may be selected for increased or reduced laminar flow, increased or reduced heat transfer, or a variety of other factors.

Integral convoluted flow restricting passages in the body of a fluid component may present manufacturing and/or assembly challenges. According to an exemplary aspect of the present application, at least a portion of a monolithic body (e.g., the central body block to which end connectors are attached) may be produced by additive manufacturing to allow for integral flow restricting passages of a variety of shapes, contours, sizes and locations, that could not readily be produced using conventional manufacturing methods (e.g., machining, casting, or molding). Examples of additive manufacturing techniques that may be utilized include, for example: laser powder bed fusion (direct metal laser sintering or "DMLS," selective laser sintering/melting or "SLS/SLM," or layered additive manufacturing or "LAM"), electron beam powder bed fusion (electron beam melting or "EBM"), ultrasonic additive manufacturing ("UAM"), or direct energy deposition (laser powder deposition or "LPD," laser wire deposition or "LWD," laser engineered net-shaping or "LENS," electron beam wire deposition).

In addition to accommodating different cross-sectional shapes and passage contours, additive manufacturing of the flow restrictive passage portion of the body of a fluid component may facilitate incorporation of additional features. As one example, portions of the flow restricting passage facing the process fluid passage may be layered with a material having a greater or lesser thermal conductivity, to provide desired heat transfer properties.

Figure 7A:
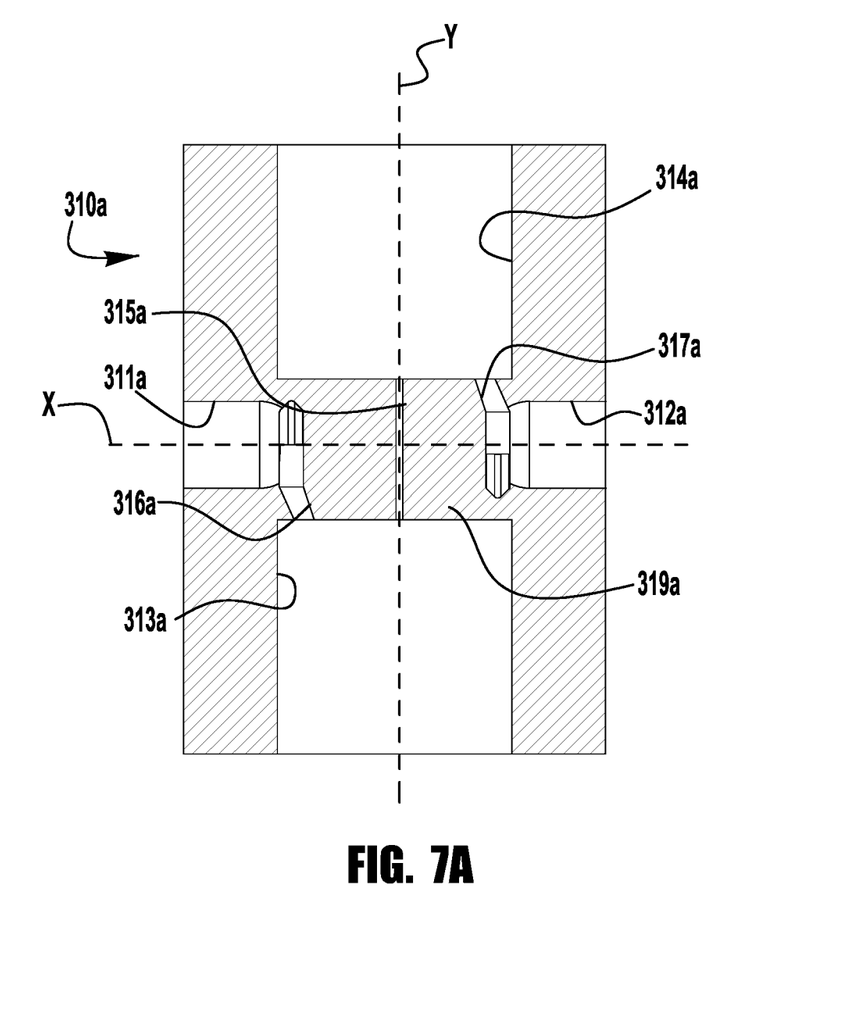
FIG. 7A is a side cross-sectional view of a fluid component body, in accordance with another aspect of the present disclosure.
Figure 7B:
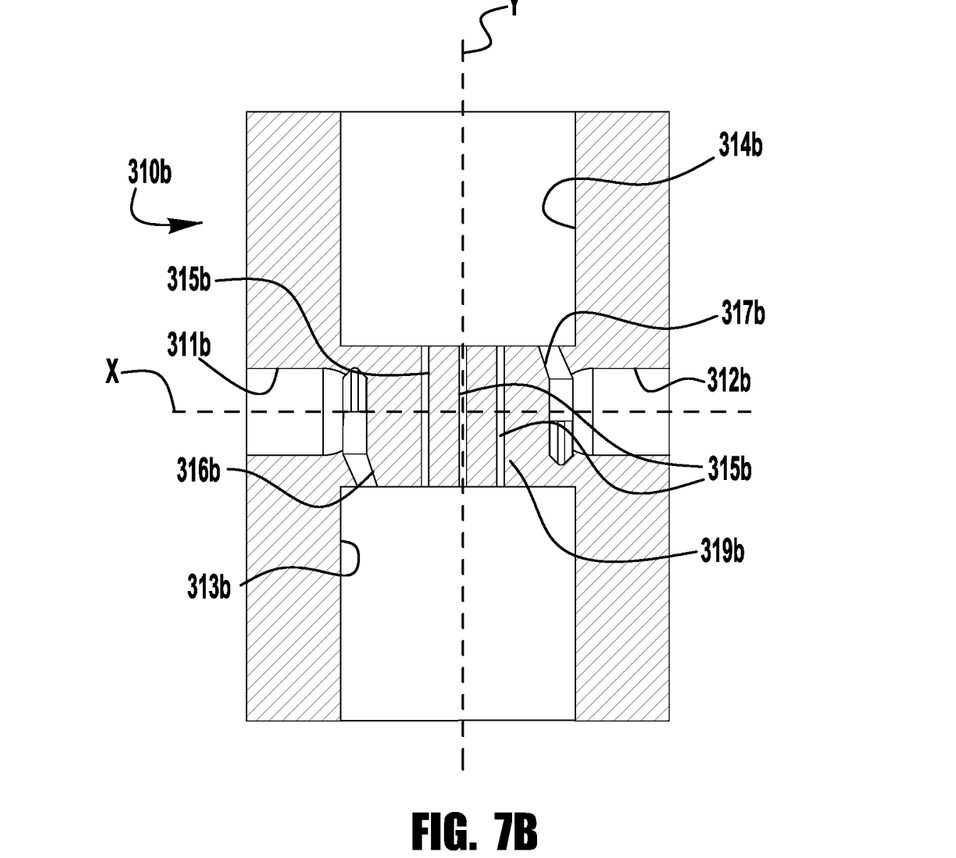
FIG. 7B is a side cross-sectional view of a fluid component body, in accordance with another aspect of the present disclosure.
Figure 7C:
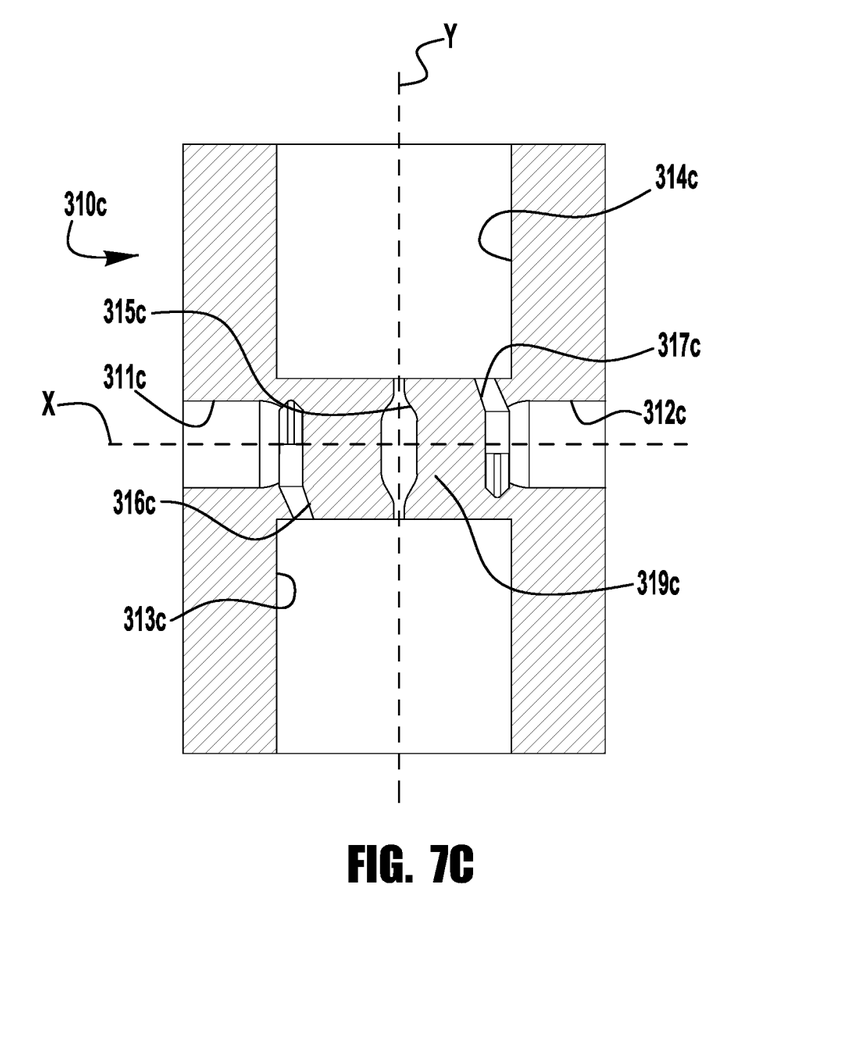
FIG. 7C is a side cross-sectional view of a fluid component body, in accordance with another aspect of the present disclosure.
Figure 7D:
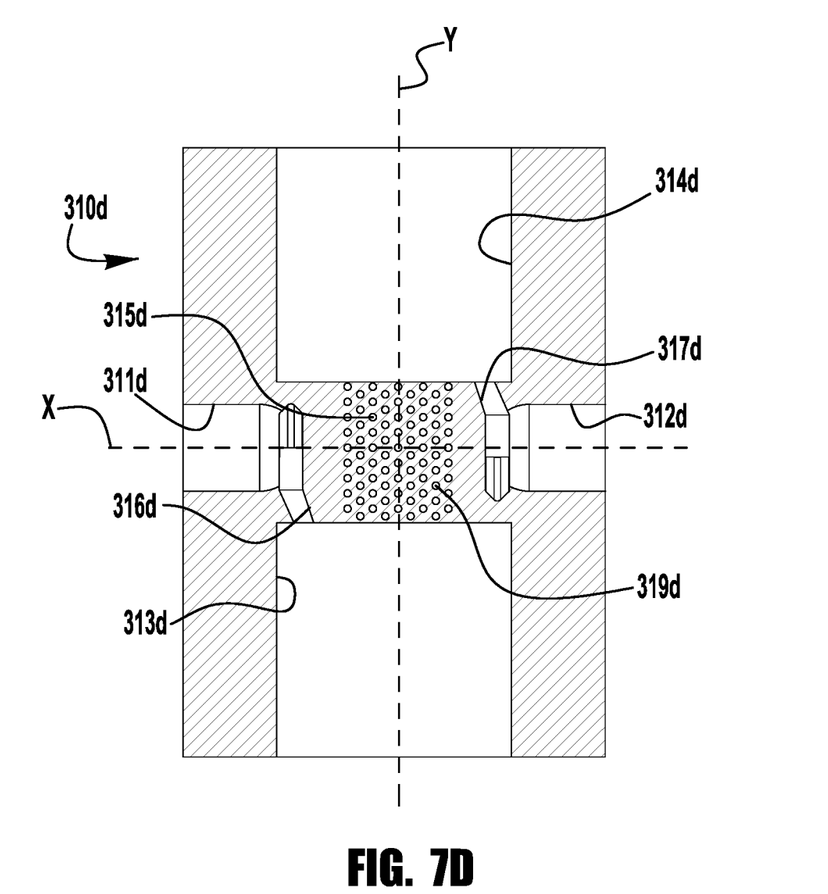
FIG. 7D is a side cross-sectional view of a fluid component body, in accordance with another aspect of the present disclosure.

In other embodiments, additive manufacturing techniques may be utilized to form other types of flow paths, including, for example, one or more straight (i.e., non-convoluted) flow paths having uniform or varying diameters, or a flow path defined by a porous material. FIG. 7A-7D illustrate exemplary fluid component bodies (e.g., flow sensing device bodies), similar to the fluid component body 210 of FIG. 5, that may be produced using additive manufacturing techniques to provide one or more flow passages between inlet and outlet ports of the body. FIG. 7A illustrates an exemplary fluid component body 310a having a single uniform flow passage 315a in a central portion 319a of the body, extending between first and second access ports 313a, 314a (e.g., pressure sensor ports) to provide a controlled flow restriction between inlet and outlet ports 311a, 312a, with the flow passage 315a being sized, for example, to provide for laminar flow conditions. FIG. 7B illustrates an exemplary fluid component body 310b having multiple uniform flow passage 315b in a central region 319b of the body, extending between first and second access ports 313b, 314b (e.g., pressure sensor ports) to provide a controlled flow restriction between inlet and outlet ports 311b, 312b, with the flow passages 315b being be sized, for example, to provide for laminar flow conditions. FIG. 7C illustrates an exemplary fluid component body 310c having one or more flow passages 315c in a central region 319c of the body, extending between first and second access ports 313c, 314c (e.g., pressure sensor ports) to provide a controlled flow restriction between inlet and outlet ports 311c, 312c, with the flow passage(s) 315c having varying diameters. FIG. 7D illustrates an exemplary fluid component body 310d having a flow passage portion 315d in a central region 319d of the body, extending between first and second access ports 313d, 314d (e.g., pressure sensor ports) to provide a controlled flow restriction between inlet and outlet ports 311d, 312d, with the flow passage portion including a porous portion of the body having a pore size and density selected, for example, to provide a desired laminar flow condition.

In other embodiments, a flow restricting passage may be provided in an insert sized to be installed in a central bore of a fluid component body. The insert may be sized to be press fit into the fluid component body bore, and/or may be provided with a gasket or other seal (which may, for example, be seated in a groove in either or both of the insert and body bore), to prevent or minimize leakage along the outer surface of the insert. This type of flow passage insert arrangement may facilitate formation of the flow passages, and/or may allow for adaptability of a flow sensing device or other fluid component, for example, by allowing for different ranges of flow rate and pressure differential. In one such arrangement, a flow sensing device or other fluid component body may be produced using conventional machining from forgings, castings, or bar stock, while the flow passage insert is formed using additive manufacturing techniques, as described above.

Figure 8A:
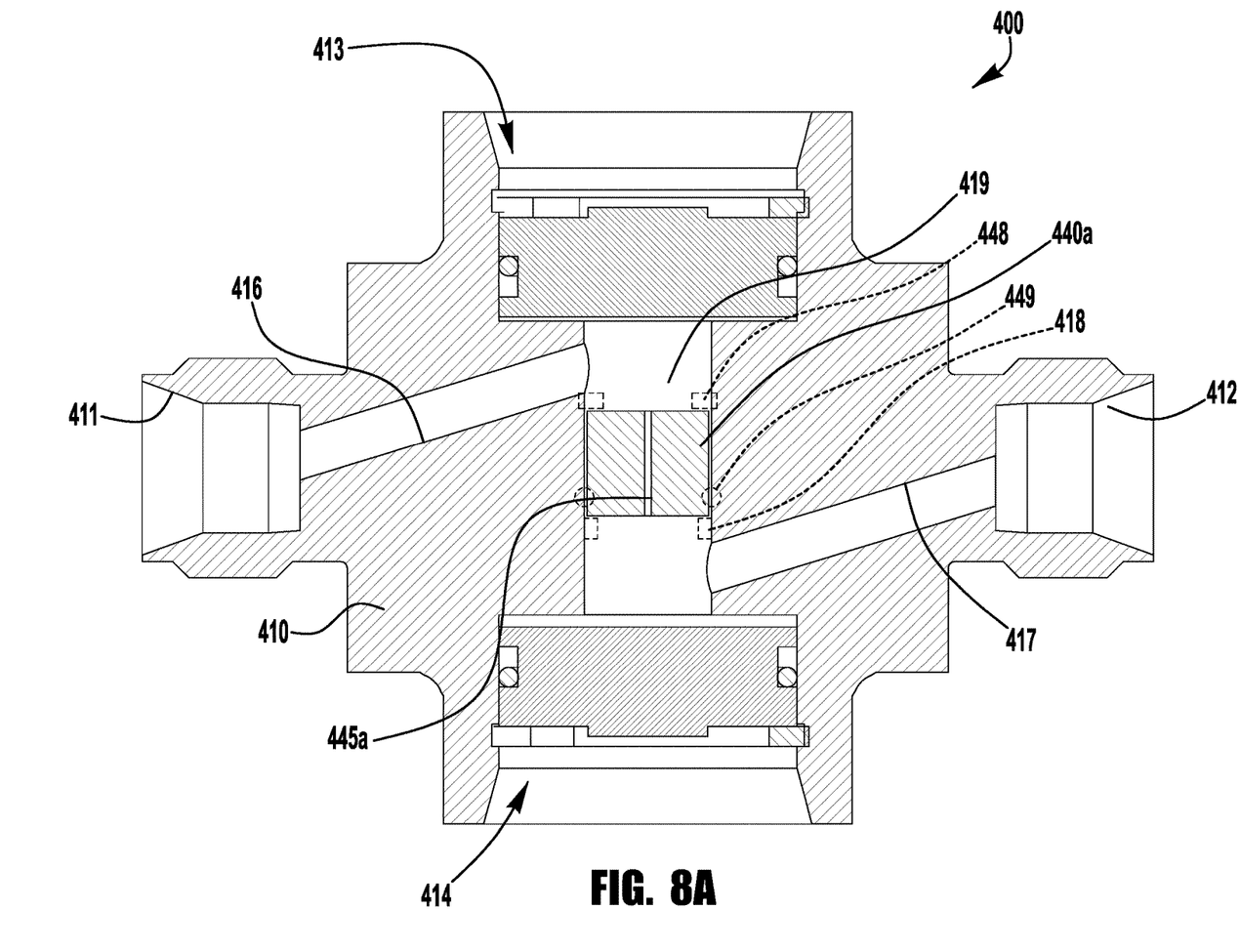
FIG. 8A is a side cross-sectional view of a flow sensing device, in accordance with another aspect of the present disclosure.
Figures 8B, 8C:
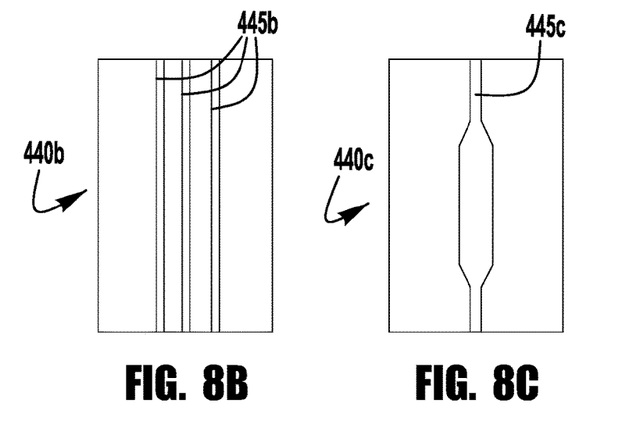
FIGS. 8B-8H are side cross-sectional schematic views of alternative flow restricting inserts for the flow sensing device of FIG. 8A.
Figure 8D:
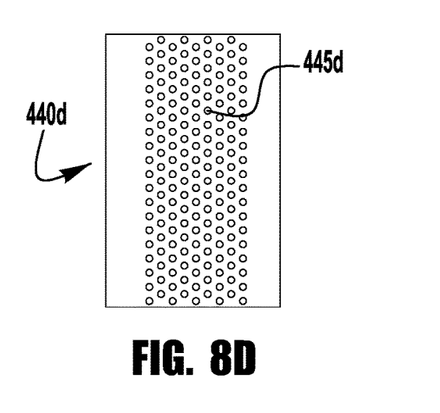
Figure 8E:
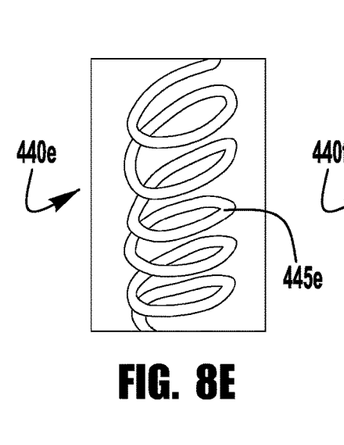
Figure 8F:
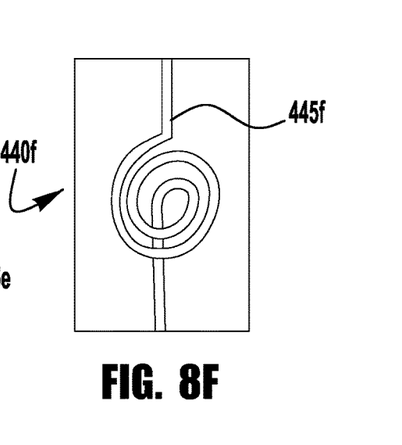
Figures 8G, 8H:
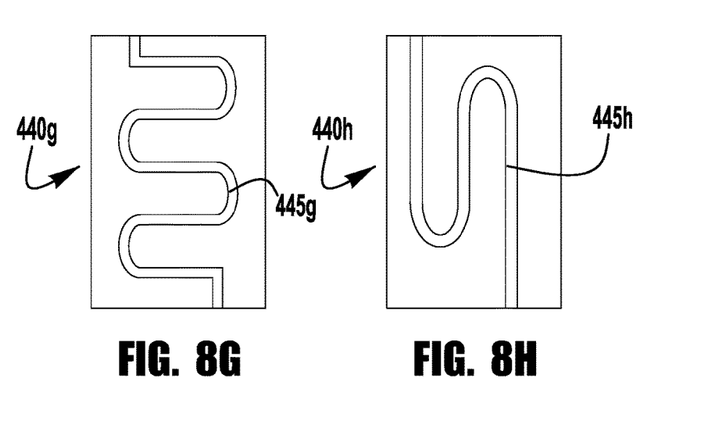

In one embodiment, a flow passage insert may be installed in a central bore of a cross-shaped fluid component (e.g., a flow sensing device) between inlet and outlet ports to provide a flow restriction between an upstream side of the fluid component and a downstream side of the fluid component. FIG. 8A illustrates an exemplary flow sensing device 400 including a cross-shaped body 410 having inlet and outlet ports 411, 412 connected (e.g., by branch ports 416, 417) with upstream and downstream pressure ports 413, 414 (shown with installed pressure sensors 420, 430), with a central cavity or bore 419 disposed between the upstream and downstream pressure ports, and a flow passage insert 440a installed in the central cavity 419. The central cavity 419 may be provided with a shoulder or counter-bore (shown in phantom at 418) to facilitate positioning of the insert 440a within the cavity. Additionally or alternatively, one or more retaining rings (shown in phantom at 448) may be installed in the central cavity 419 to securely position the insert 440a. The insert 440a may be sized to be press fit into the fluid component cavity 419, and/or may be provided with a gasket or other seal, shown in phantom at 449 (which may, for example, be seated in a groove in either or both of the insert and body bore), to prevent or minimize leakage along the outer surface of the insert 440a.

The illustrated insert 440a includes a single narrow flow passage 445a, sized and configured, for example, to promote laminar flow. In other embodiments, the flow passage insert may be provided with other flow restricting passages. For example, as illustrated in FIGS. 8B-8H, a flow passage insert 440b-h may include multiple narrow flow passages 445b (FIG. 8B), one or more passages 445c having varying diameters (FIG. 8C), a passage defined by porous material 445d (i.e., a plug of porous material, structurally similar to a sintered element) (FIG. 8D), a helical passage 445e (FIG. 8E), a spiral passage 445f (FIG. 8F), a laterally extending undulating ribbon shape passage 445g (FIG. 8G), and an axially extending undulating ribbon shape passage 445h (FIG. 8H), or any of the other types of restricted flow passages shown or described herein.

Figure 9:
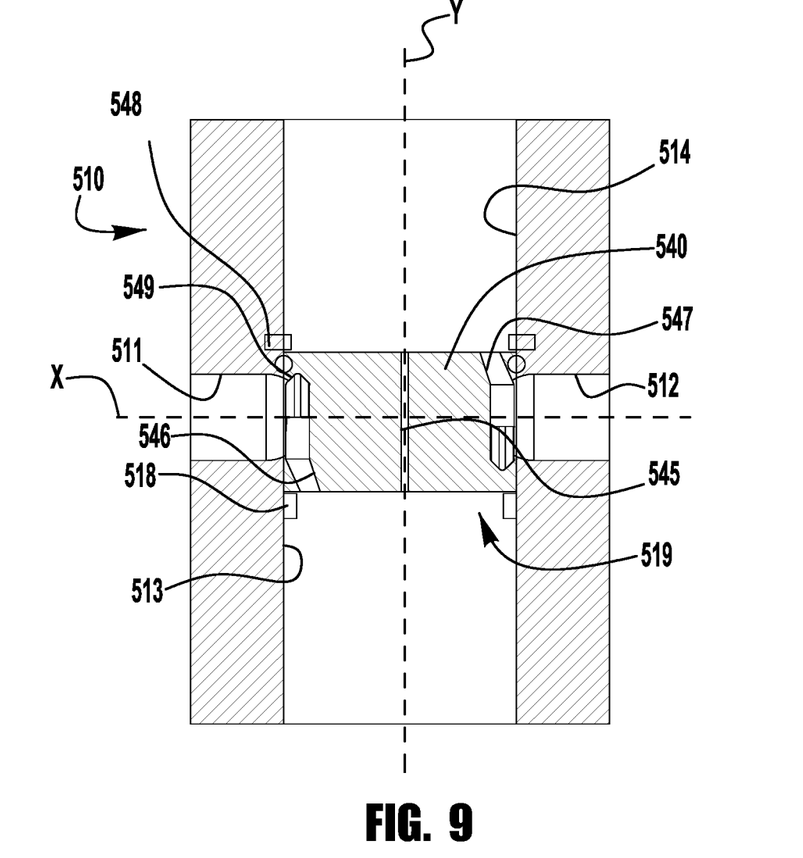
FIG. 9 is a side cross-sectional view of a fluid component, in accordance with another aspect of the present disclosure.

While the inlet and outlet ports 411, 412 (with branch ports 416, 417) may be fully defined by the fluid component body 410, as shown in FIG. 8A, in other embodiments, at least a portion of the inlet and outlet ports may be formed in the flow passage insert, for example, to allow for a more compact fluid component body, and/or to facilitate manufacturing of the body. FIG. 9 illustrates an exemplary fluid component body 510 having inlet and outlet ports 511, 512 extending into a central bore or passage defining upstream and downstream pressure ports 513, 514 and a central cavity 519 disposed between the upstream and downstream pressure ports. A flow passage insert 540 is installed in the central cavity 519, and includes branch ports 546, 547 that align with the inlet and outlet ports 511, 512, and a flow passage 545 extending between the upstream and downstream pressure ports 513, 514. The central cavity 519 may be provided with a shoulder or counter-bore (shown in phantom at 518) to facilitate positioning of the insert 540 within the cavity. Additionally or alternatively, one or more retaining rings (shown in phantom at 548) may be installed in the central cavity 519 to securely position the insert 540. The insert 540 may be sized to be press fit into the fluid component cavity 519, and/or may be provided with a gasket or other seal, shown in phantom at 549 (which may, for example, be seated in a groove in either or both of the insert and body bore), to prevent or minimize leakage along the outer surface of the insert 540.

The illustrated insert 540 includes a single narrow flow passage 545, sized and configured, for example, to promote laminar flow. In other embodiments, the flow passage insert may be provided with other flow restricting passages, including, for example, any of the other types of restricted flow passages shown or described herein.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A flow restricting fluid component comprising a monolithic body including first and second axially extending ports connected in fluid communication by a convoluted flow restricting passage including one or more of: a helical shape, a spiral shape, a laterally extending undulating ribbon shape, and an axially extending undulating ribbon shape, wherein the monolithic body further comprises laterally extending first and second flow ports and axially extending first and second access ports, with the first flow port connected in fluid communication with the first access port by a first branch port, the second flow port connected in fluid communication with the second access port by a second branch port, and the first and second access ports connected in fluid communication by the convoluted flow restricting passage.

2. The flow restricting fluid component of claim 1, wherein the body is formed using additive manufacturing techniques.

3. The flow restricting fluid component of claim 1, wherein the convoluted flow restricting passage is configured to provide laminar flow.

4. A fluid component comprising a cross-shaped body including:

laterally extending first and second flow ports and axially extending first and second access ports, with the first flow port connected in fluid communication with the first access port by a first branch port, the second flow port connected in fluid communication with the second access port by a second branch port, and the first and second access ports connected in fluid communication by a convoluted flow restricting passage extending generally axially from the first access port to the second access port.

5. The fluid component of claim 4, wherein the convoluted flow restricting passage including one or more of: a helical shape, a spiral shape, a laterally extending undulating ribbon shape, and an axially extending undulating ribbon shape.

6. The fluid component of claim 4, wherein the cross-shaped body is monolithically formed and defines the first and second flow ports, the first and second access ports, the first and second branch ports, and the convoluted flow restricting passage.

7. The fluid component of claim 4, wherein the cross-shaped body is formed using additive manufacturing techniques.

8. The fluid component of claim 4, further comprising an insert installed in a cavity in the fluid component, the insert defining the convoluted flow restricting passage.

9. The fluid component of claim 8, wherein the insert is formed using additive manufacturing techniques.

10. The fluid component of claim 4, wherein the convoluted flow restricting passage is configured to provide laminar flow.

11. A flow sensing device comprising:
a cross-shaped body including laterally extending inlet and outlet ports and axially extending upstream and downstream pressure ports, with the inlet port connected in fluid communication with the upstream pressure port by an inlet branch port, the outlet port connected in fluid communication with the downstream pressure port by an outlet branch port, and the upstream and downstream pressure ports connected in fluid communication by a flow restricting passage extending generally axially from the upstream pressure port to the downstream pressure port;
an upstream pressure sensor installed in the upstream pressure port; and
a downstream pressure sensor installed in the downstream pressure port.

12. The flow sensing device of claim 11, wherein the flow restricting passage including one or more of: a helical shape, a spiral shape, a laterally extending undulating ribbon shape, an axially extending undulating ribbon shape, a straight uniform shape, a straight varying diameter shape, and a porous material portion.

13. The flow sensing device of claim 11, wherein the cross-shaped body is formed using additive manufacturing techniques.

14. The flow sensing device of claim 11, wherein the flow restricting passage is configured to provide laminar flow.

15. A fluid component comprising:
a body including laterally extending first and second flow ports and axially extending first and second access ports, with the first flow port connected in fluid communication with the first access port by a first branch port, the second flow port connected in fluid communication with the second access port by a second branch port, and a cavity disposed between the first and second access ports; and
an insert installed in the cavity, the insert including a generally axially extending flow restricting passage extending from the first access port to the second access port.

16. The fluid component of claim 15, wherein the flow restricting passage includes one or more of: a helical shape, a spiral shape, a laterally extending undulating ribbon shape, an axially extending undulating ribbon shape, a straight varying diameter shape, and a porous material portion.

17. The fluid component of claim 15, wherein the insert is formed using additive manufacturing techniques.

18. The fluid component of claim 15, wherein the flow restricting passage is configured to provide laminar flow.

* * * * *

UNITED STATES PATENT AND TRADEMARK OFFICE
CERTIFICATE OF CORRECTION

| | |
|---|---|
| PATENT NO. | : 10,883,865 B2 |
| APPLICATION NO. | : 16/574147 |
| DATED | : January 5, 2021 |
| INVENTOR(S) | : Michael D. Bestic |

It is certified that error appears in the above-identified patent and that said Letters Patent is hereby corrected as shown below:

On the Title Page

Item (72), Please add the following inventor:
---Marius O. Stroescu, Mayfield Heights, Ohio (US)---

Signed and Sealed this
Second Day of August, 2022

Katherine Kelly Vidal
*Director of the United States Patent and Trademark Office*